(No Model.)
H. ILLIG.
ELECTRIC METER.
No. 489,161. Patented Jan. 3, 1893.
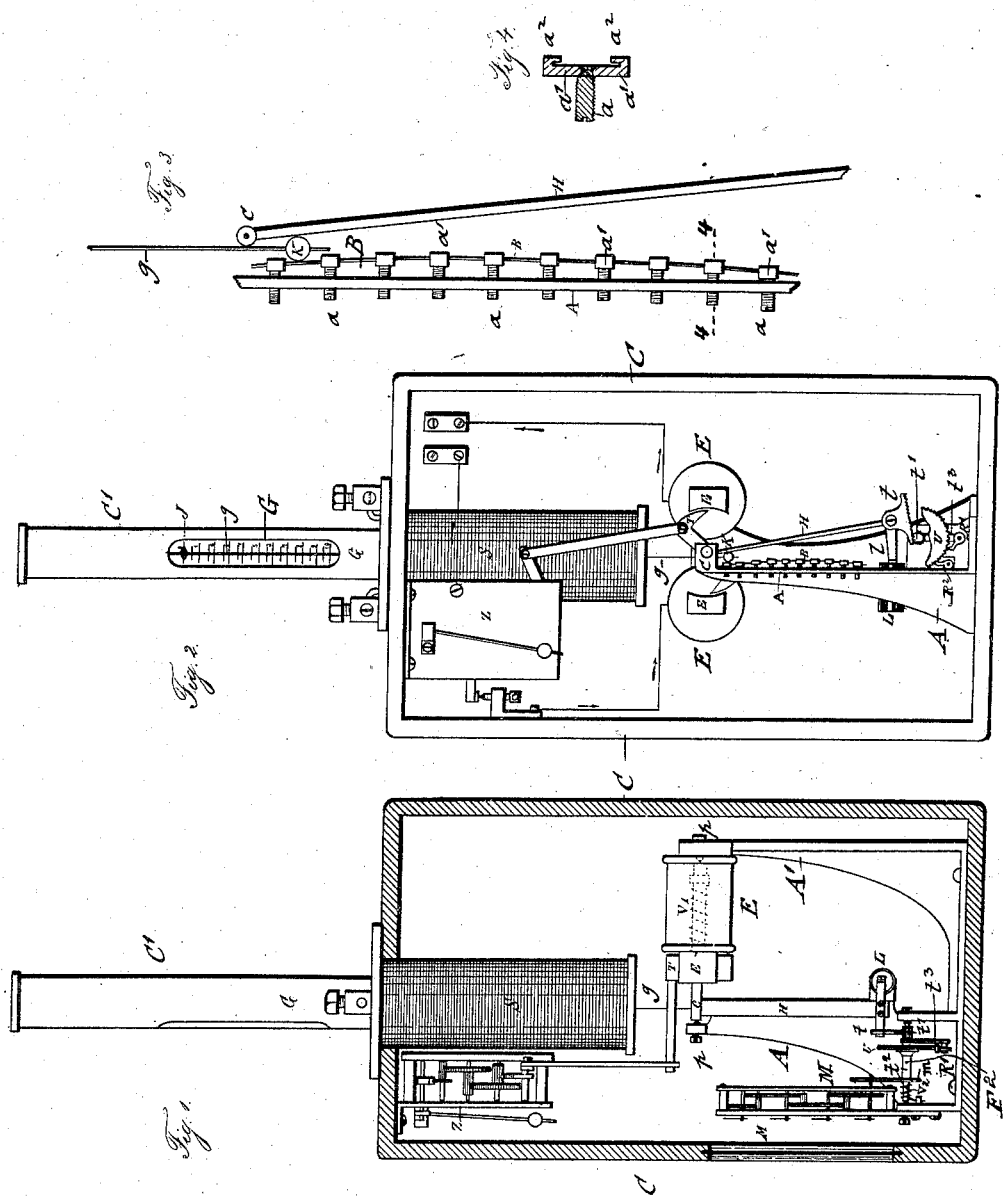
WITNESSES:
INVENTOR:
Heinrich Illig
BY *Gorme & Raegner*
ATTORNEYS.

UNITED STATES PATENT OFFICE.

HEINRICH ILLIG, OF BOCKENHEIM, GERMANY.

ELECTRIC METER.

SPECIFICATION forming part of Letters Patent No. 489,161, dated January 3, 1893.

Application filed January 7, 1892. Serial No. 417,274. (No model.)

*To all whom it may concern:*

Be it known that I, HEINRICH ILLIG, a citizen of the German Empire, residing at Bockenheim, near Frankfort-on-the-Main, in the Empire of Germany, have invented certain new and useful Improvements in Electric Meters, of which the following is a specification.

This invention relates to an improved meter for measuring the quantity of electric current used for lighting or other purposes; and the invention consists of an electric meter that comprises a solenoid located in the main-circuit, a current-indicator connected with the core of the solenoid, a weight suspended from said core, an oscillating lever, a motor for oscillating said lever, a curved guide-strip for the weight suspended from the core of the solenoid, transmitting mechanism operated by the lever and a registering-device operated by said transmitting mechanism by which register the quantity of the current passing through the meter is indicated.

The invention consists, secondly, in the novel construction of the curved flexible guide-strip, along which the weight suspended from the core of the solenoid is guided, as will be fully described hereinafter and finally pointed out in the claims.

In the accompanying drawings, Figure 1 represents a side-elevation of my improved electric meter, partly in section through the casing of the same; Fig. 2 is a front-elevation of the same with the front plate and registering-device removed for showing the parts back of the same; Fig. 3 is a side-elevation of the curved guide-strip for the weight suspended from the core of the solenoid, drawn on a larger scale; and Fig. 4 is a longitudinal section on line 4 4, Fig. 3, also on a larger scale, showing one of the screw-studs by which the curved guide-strip is supported.

Similar letters of reference indicate corresponding parts.

Referring to the drawings, C represents the casing of my improved electric meter, which is composed of three main-parts, a current indicator G, a clock-train Z and a switch-device. The current-indicator can be made of any approved construction, that shown in the drawings being a so-called spring-galvanometer G, which is arranged in a cylindrical casing C' that extends above the main-casing C. The current to be measured is conducted through the spring-galvanometer G and then through a solenoid S, the core of which is drawn in more or less by the action of the current. To the core is attached a thin wire $g$ which extends above and below the solenoid S, the upper part of the wire extending into the spring-galvanometer G, while the lower part extends to some distance below the solenoid. The upper part of the wire carries an index J, which moves along the scale of the galvanometer. When a current-indicator with a circular scale is used, a string is used in place of the upper part of the wire, which string is passed over a pulley that is attached to the arbor of the index and provided at its end with a spherical or lens-shaped weight K. Such a weight is also applied to the lower part of the wire $g$ that passes through the solenoid.

Vertically below the current-indicator G is arranged a stationary standard A which carries a number of screw-studs $a$, to the ends of which are swiveled keepers $a'$ having inwardly-bent flanges $a^2$, as shown in Fig. 4. The number of screw-studs $a$ which are arranged on the standard A correspond to the graduations of the scale of the current-indicator G. The keepers $a'$ support a guide-strip B of flexible material that can be readily bent into shape, the guide-strip B being so supported by the keepers $a'$ that the weight K at the lower end of the wire $g$ moves freely over the middle part of the strip without being obstructed by the inwardly-bent flanges of the keeper $a^2$. Opposite the guide-strip B is arranged a straight lever H that is attached at its upper end to a pivot $c$, which is supported by conical pins $p$, so as to turn with the least possible friction on its axis. The lever H is connected at its lower end with a piston-rod $l$ of a small air-brake L and is provided with a toothed segment $t$ that meshes with a pinion $t'$, the shaft of which is supported in conical anti-friction pins, as shown clearly in Fig. 1. To the shaft of the pinion $t'$ is attached an arm $t^3$ that carries at its lower end a pawl R' which meshes with a minutely-toothed segment U, which is furthermore engaged by a check-pawl R². The sleeve-shaped hub of the toothed segment U turns on the pinion-shaft F² and carries a gear-wheel *m* by which the motion of the toothed segment U is transmitted to the gear-wheels of a registering-device M, which indicates the quantity of current passing through the meter on suitable dials in the nature of gas or other registers. A small spring V² is placed on the shaft t² of the pinion t' and connected to the gear-wheel *m* and to a fixed point, said spring serving for the purpose hereinafter to be described.

At the upper part of the casing, sidewise of the solenoid S, is arranged a clock-train Z, the object of which is to send a shunt-current at certain determined intervals, say once every minute, into an electro-magnet E supported on a standard A'. As soon as the current passes through the electro-magnet E, the Z-shaped armature T of the same, which is loosely applied to the pivot *c* and located between the concave pole-faces of the electro-magnet E, is attracted and the lever H moved toward the weight K until it is stopped by the latter. As the armature T is loosely supported on the pivot *c* and connected therewith by the spring V', it can continue its motion around the pivot *c*. The yielding connection of the armature T with the pivot *c* by the spiral spring V' has a two-fold purpose, first, to permit the armature to move independently of the greater or smaller oscillations of the lever H, and, secondly, to move the armature always through the same or nearly the same distance, so that it can re-wind the clock-train after each contact of the same. The rewinding is accomplished by connecting one end of the armature T by a pivot-link with an arbor on the shaft of the winding-spring, as shown in Figs. 1 and 2.

As the graduated scale of the current-indicator can never be a proportional one, it is obvious that the shape of the guide-strip B can have no perfectly defined form when for each sub-division of the scale of the current-indicator a corresponding number of teeth have to be operated. It is therefore possible, even with an unequal scale of the current-indicator to adjust the shape of the guide-strip B by the forward and backward motion of its supporting-screws, so that for each position of the index of the current-indicator the corresponding equivalent is transmitted to the register M.— In place of working the transmitting and registering-devices electrically by the clock-train, these devices can also be operated mechanically at regular intervals by means of a clock-train which is wound up from time to time by hand.

My improved electric meter operates as follows; when the current passes through the solenoid S, the index J of the current-indicator is moved in downward direction as the core is drawn in. Simultaneously the ball-shaped weight K at the lower end of the wire suspended from the core, is moved in downward direction and passed over the guide-strip B until it arrives, according to the strength of the current, at a position of rest. When the clock-train now makes a contact, a shunt-current passes through the electro-magnet E and attracts thereby the Z-shaped armature T which moves at the same time the lever H toward the weight K until it is stopped by the latter. The armature continues its motion so as to wind up the clock-train as before described. The more the weight K has moved down from its normal position, the greater will be the oscillation of the lever H until it is stopped by the weight K. The oscillating-motion of the lever H is transmitted by the segment *t* at its lower end, pinion *t'*, arm *t³*, pawl R' and segment U to the registering-device M and registered by the same. As soon as the shunt-current is interrupted, the electro-magnet releases its armature which returns into its normal position whereby the tension of the spring V' is discontinued. The weaker spring V² which is arranged on the shaft *t²* of the pinion *t'* is set to tension during the transmitting of the motion of the lever H to the register and serves to return the pawl R' and the lever H into their normal position. The check-pawl R² prevents the segment U from moving in opposite direction, while the air-brake L retards the axial motion of the same. As the current is measured at fixed intervals and counted by the register M, the quantity of current passed through the meter can be readily determined.

Having thus described my invention, what I claim as new and desire to secure by Letters Patent, is:

1. An electric meter, composed of a solenoid located in the main circuit, a current-indicator connected with the core of the solenoid, a weight suspended from the core, an oscillating lever, an electro magnet for operating said lever, a clock train controlling the current of said magnet, a curved guide-strip for the weight, a registering-device and transmitting-mechanism between the oscillating lever and the registering-device, substantially as set forth.

2. An electric meter, composed of a solenoid located in the main-circuit, a current-indicator actuated by the core of the solenoid, a weight suspended from the core, a clock-train forming intermittent contact, an electro-magnet located in a shunt-circuit, an armature operated by said electro-magnet, a lever oscillated by said armature, a curved strip for guiding the weight suspended from the core, a registering-device and transmitting-mechanism between the oscillating-lever and the registering-device, substantially as set forth.

3. In an electric meter, a flexible guide-strip supported by a series of flanged keepers swiveled to adjusting screw-studs, so that the shape of the guide-strip can be adjusted to correspond to the graduations of the current-indicator, substantially as set forth.

4. In an electric meter, a supporting-standard provided with a series of adjustable screw-studs, flanged keepers swiveled to the ends of said studs, and a flexible guide-strip supported by said keepers, substantially as set forth.

In testimony that I claim the foregoing as my invention I have signed my name in presence of two subscribing witnesses.

HEINRICH ILLIG.

Witnesses:
CHRISTOPH PETER ADAM,
FRIEDRICH FERDINAND HAMMER.